US008213706B2

(12) United States Patent
Krishnaswamy et al.

(10) Patent No.: US 8,213,706 B2
(45) Date of Patent: Jul. 3, 2012

(54) METHOD AND SYSTEM FOR REAL-TIME VISUAL ODOMETRY

(75) Inventors: Kailash Krishnaswamy, Little Canada, MN (US); Sara Susca, Minneapolis, MN (US); Robert C. McCroskey, Burnsville, MN (US)

(73) Assignee: Honeywell International Inc., Morristown, NJ (US)

( * ) Notice: Subject to any disclaimer, the term of this patent is extended or adjusted under 35 U.S.C. 154(b) by 1023 days.

(21) Appl. No.: 12/107,722

(22) Filed: Apr. 22, 2008

(65) Prior Publication Data
US 2009/0263009 A1    Oct. 22, 2009

(51) Int. Cl.
*G06K 9/00*    (2006.01)
(52) U.S. Cl. ......... 382/154; 382/103; 382/284; 382/306
(58) Field of Classification Search .................. 382/154; 700/250, 245, 258, 263
See application file for complete search history.

(56) References Cited

U.S. PATENT DOCUMENTS

| | | | |
|---|---|---|---|
| 4,584,646 A | 4/1986 | Chan et al. |
| 4,671,650 A | 6/1987 | Hirzel et al. |
| 4,847,769 A | 7/1989 | Reeve |
| 5,048,022 A | 9/1991 | Bissett |
| 5,144,685 A | 9/1992 | Nasar et al. |
| 5,200,606 A | 4/1993 | Krasutsky et al. |
| 5,208,757 A | 5/1993 | Appriou et al. |
| 5,272,639 A | 12/1993 | McGuffin |
| 5,335,181 A | 8/1994 | McGuffin |
| 5,363,305 A | 11/1994 | Cox et al. |
| 5,434,997 A | 7/1995 | Landry |
| 5,525,882 A | 6/1996 | Asaka et al. |
| 5,537,655 A | 7/1996 | Truong |
| 5,577,130 A | 11/1996 | Wu |
| 5,590,059 A | * 12/1996 | Schier ........................... 702/151 |
| 5,751,932 A | 5/1998 | Horst |
| 5,867,591 A | 2/1999 | Onda |
| 5,894,323 A | 4/1999 | Kain et al. |

(Continued)

FOREIGN PATENT DOCUMENTS
EP    1921867    5/2008

(Continued)

OTHER PUBLICATIONS

Agrawal et al., "Real-Time Localization in Outdoor Environments Using Stereo Vision and Inexpensive GPS", "2006 18th International Conference on Pattern Recognition IEEE Comput.", 2006.

(Continued)

*Primary Examiner* — Chan S Park
*Assistant Examiner* — Aklilu Woldemariam
(74) *Attorney, Agent, or Firm* — Fogg & Powers LLC

(57) ABSTRACT

A method for real-time visual odometry comprises capturing a first three-dimensional image of a location at a first time, capturing a second three-dimensional image of the location at a second time that is later than the first time, and extracting one or more features and their descriptors from each of the first and second three-dimensional images. One or more features from the first three-dimensional image are then matched with one or more features from the second three-dimensional image. The method further comprises determining changes in rotation and translation between the first and second three-dimensional images from the first time to the second time using a random sample consensus (RANSAC) process and a unique iterative refinement technique.

20 Claims, 3 Drawing Sheets

U.S. PATENT DOCUMENTS

| | | | |
|---|---|---|---|
| 5,949,678 A * | 9/1999 | Wold et al. | 700/83 |
| 5,957,984 A | 9/1999 | Rencken | |
| 5,999,866 A | 12/1999 | Kelly et al. | |
| 6,065,135 A | 5/2000 | Marshall | |
| 6,115,508 A * | 9/2000 | Lopresti et al. | 382/306 |
| 6,233,702 B1 | 5/2001 | Horst | |
| 6,278,906 B1 | 8/2001 | Piepmeier et al. | |
| 6,307,959 B1 | 10/2001 | Mandelbaum et al. | |
| 6,445,983 B1 | 9/2002 | Dickson et al. | |
| 6,704,619 B1 | 3/2004 | Coleman et al. | |
| 6,922,632 B2 | 7/2005 | Foxlin | |
| 7,145,478 B2 | 12/2006 | Goncalves et al. | |
| 7,162,338 B2 | 1/2007 | Goncalves et al. | |
| 7,177,737 B2 | 2/2007 | Karlsson et al. | |
| 7,194,126 B2 | 3/2007 | Konolige | |
| 7,248,968 B2 | 7/2007 | Reid | |
| 7,272,467 B2 | 9/2007 | Goncalves et al. | |
| 7,305,303 B2 | 12/2007 | Soehren et al. | |
| 7,372,859 B2 | 5/2008 | Hall et al. | |
| 7,475,284 B2 | 1/2009 | Koike | |
| 7,565,029 B2 * | 7/2009 | Zhou et al. | 382/284 |
| 7,848,850 B2 * | 12/2010 | Hoshino et al. | 700/264 |
| 2002/0026604 A1 | 2/2002 | Bissett | |
| 2002/0046365 A1 | 4/2002 | Avizienis | |
| 2003/0045816 A1 | 3/2003 | Foxlin | |
| 2003/0204713 A1 | 10/2003 | Hales | |
| 2003/0208289 A1 * | 11/2003 | Ben-Arie | 700/61 |
| 2004/0039483 A1 * | 2/2004 | Kemp et al. | 700/245 |
| 2004/0168148 A1 | 8/2004 | Goncalves et al. | |
| 2006/0116803 A1 | 6/2006 | Armbruster et al. | |
| 2006/0287083 A1 | 12/2006 | Ofek et al. | |
| 2007/0067673 A1 | 3/2007 | Avizienis | |
| 2007/0078564 A1 * | 4/2007 | Hoshino et al. | 700/245 |
| 2007/0220367 A1 | 9/2007 | Smith et al. | |
| 2008/0144925 A1 * | 6/2008 | Zhu et al. | 382/154 |
| 2008/0273751 A1 * | 11/2008 | Yuan et al. | 382/103 |
| 2010/0017034 A1 * | 1/2010 | Nakadai et al. | 700/258 |

FOREIGN PATENT DOCUMENTS

| | | |
|---|---|---|
| GB | 2289389 | 11/1995 |
| GB | 2328280 | 2/1999 |
| WO | 2006084385 | 8/2006 |
| WO | 2008000711 | 1/2008 |

OTHER PUBLICATIONS

European Patent Office, "European Search Report", Aug. 14, 2009, Published in: EP.

Hartley et al., "Estimation—2D Projective Transformations", Jan. 1, 2003, pp. 87-131, Publisher: Cambridge University Press.

Agrawal et al., "Rough Terrain Visual Odometry", "Proceedings of the International Conference on Advanced Robotics (ICAR)", Aug. 2007, pp. 1-6.

Ess et al., "Generalised Linear Pose Estimation", "British Machine Vision Conferenece (BMVC '07)", Sep. 2007, pp. 1-10.

Fischler et al., "Random Sample Consensus: A Paradigm for Model Fitting With Applications to Image Analysis and Automated Cartography", "Communications of the ACM", Jun. 1981, pp. 381-395, vol. 24, No. 6, Publisher: ACM.

Horn et al., "Closed-Form Solution of Absolute Orientation Using Orthonormal Matrices", "Journal of the Optical Society of America", Jul. 1988, pp. 1127-1135, vol. 5, No. 7, Publisher: Optical Society of America.

Horn, "Closed-Form Solution of Absolute Orientation Using Unit Quaternions", "Journal of the Optical Society of America", Apr. 1987, pp. 629-642, vol. 4, Publisher: Optical Society of America.

Kelly et al., "Combined Visual and Inertial Navigation for an Unmanned Aerial Vehicle", "6th International Conference on Field and Service Robotics", Jul. 2007, pp. 1-10.

Kelly et al., "An Experimental Study of Aerial Stereo Visual Odometry", "Proceedings of the International Federation of Automatic Controll (IFAC) Symposium on Intelligent Autonomous Vehicles", Sep. 2007, pp. 1-6.

Mirisola et al., "3D Map Registration Using Vision/Laser and Inertial Sensing", "3rd European Conference on Mobile Robots", Sep. 2007, pp. 1-6.

Mirisola et al., "Trajectory Recovery and 3D Mapping for Rotation-Compensated Imagery for an Airship", "Proceedings of the IEEE/RSJ International Conference on Intelligent Robots and Systems (IROS)", Oct. 2007, pp. 1908-1913, Publisher: IEEE.

Ni et al., "Stereo Tracking and Three-Point/One-Point Algorithms—A Robust Approach in Visual Odometry", "2006 IEEE International Conference on Image Processing", Oct. 2006, pp. 2227-2780, No. 8-11, Publisher: IEEE.

Nister et al., "Visual Odometry", "Proceedings of the 2004 IEEE Computer Society Conference on Computer Vision and Pattern Recognition", Jun. 27, 2004, pp. 652-659, vol. 1, Publisher: CVPR, Published in: Washington D.C.

Steder et al., "Learning Maps in 3D Using Attitude and Noisy Vision Sensors", "Proceedings of the IEEE/RSJ International Conference on Intelligent Robots and Systems (IROS)", 2007, pp. 1-6, Publisher: IEEE.

Sunderhauf et al., "Stereo Odometry—A Review of Approaches", "Technical Report", Mar. 2007, pp. 1-6, Publisher: Chemnitz University of Technology, Published in: Germany.

Diel et al., "Epipolar Constraints for Vision-Aided Inertial Navigation", "Proceedings of the IEEE Workshop on Motion and Video Computing (WACV/Motion'05)", 2005, pp. 221-228, vol. 2, Publisher: IEEE.

Harris et al., "A Combined Corner and Edge Detector", 1988, pp. 147-151, Publisher: The Plessey Company, Published in: United Kingdom.

Lucas et al., "An Iterative Image Registration Technique With an Application to Stereo Vision", "Proc 7th Intl Joint Conf on Artificial Intelligence (IJCAI)", Aug. 24, 1981, pp. 674-679, Published in: Vancouver, British Columbia.

Tomasi et al., "Shape and Motion From Image Streams—A Factorization Method—Part 3 Detection and Tracking of Point Features", "Technical Report CMU-CS-91-132", Apr. 1991, pp. 1-20.

Broatch et al., "An Integrated Navigation System Manager Using Federated Kalman Filtering", May 1991, pp. 422-426, vol. 1, Publisher: IEEE.

Campbell et al., "Flash—LADAR Inerital Navigator Aiding", Position, Location, and Navigation Symposium, Apr. 2006, pp. 677-683, Publisher: IEEE.

Peters, "Development of a TRN/INS/GPS integrated navigation system", Mar. 1992, pp. 202-208, Publisher: IEEE.

\* cited by examiner

METHOD AND SYSTEM FOR REAL-TIME VISUAL ODOMETRY

RELATED APPLICATIONS

This application is related to U.S. patent application Ser. No. 11/673,893, filed on Feb. 12, 2007, and entitled "SYSTEM AND METHOD FOR MOTION ESTIMATION USING VISION SENSORS" which is incorporated herein by reference.

This application is also related to U.S. patent application Ser. No. 11/673,906, filed on Feb. 12, 2007, and entitled "SENSOR FUSION FOR NAVIGATION" which is incorporated herein by reference.

BACKGROUND

The need to know one's location arises in many situations. For example, an operator of an aircraft, spacecraft, ground vehicle, or the like needs to know the location of the craft or vehicle in order to properly maneuver the vehicle and avoid dangerous conditions. In addition, unmanned vehicles, such as unmanned aerial vehicles (UAVs) or mobile robots also need accurate position and velocity information in order to properly navigate an area.

On and around Earth, precise navigation can usually be resolved with the aid of a Global Positioning System (GPS) sensor. However, GPS signals are not always available. For example, a GPS signal may not be available when a vehicle is traveling in a city among tall buildings or through large canyons. When GPS signals are not available, precision navigation becomes more difficult. In the absence of GPS signals, most current known navigation methods are susceptible to drift.

Technologies related to navigation in the absence of GPS signals are receiving much attention both from the military and commercial sectors. Typical approaches only provide for relative navigation, which means that the only way a platform can navigate is by dead reckoning. Dead reckoning is the process of estimating one's current position based upon a previously determined position, and advancing that position based upon known speed, elapsed time, and course.

Modern inertial navigation systems, which depend upon dead reckoning, are widely used in various manned or autonomous vehicles. Such inertial navigation systems use a computer and motion sensors to continuously track the position, orientation, and velocity of a vehicle without the need for external references such as a GPS. The main component of such inertial navigation systems is an inertial measurement unit (IMU). An IMU works by sensing its own rate and direction of motion using a combination of accelerometers and gyroscopes, which then allow a guidance computer to track vehicle position using dead reckoning.

A serious problem with dead reckoning is integration drift. As dead reckoning uses an integration method to navigate, velocity/rate estimate errors are integrated, leading to a random unbounded drift of the navigation position/attitude solution. Thus, there is a need for techniques that can be used to limit the effects of integration drift by minimizing the errors in the velocity/rate estimate.

SUMMARY

The present invention relates to a method and system for real-time visual odometry. The method comprises capturing a first three-dimensional image of a location at a first time, capturing a second three-dimensional image of the location at a second time that is later than the first time, and extracting one or more features and their descriptors from each of the first and second three-dimensional images. One or more features from the first three-dimensional image are then matched with one or more features from the second three-dimensional image. The method further comprises determining changes in rotation and translation between the first and second three-dimensional images from the first time to the second time using a random sample consensus (RANSAC) process and a unique iterative refinement technique.

The iterative refinement technique comprises receiving a first set of inliers and changes in rotation and translation for the first set of inliers outputted from the RANSAC process, and scoring the changes in rotation and translation for the set of inliers. The refinement technique further comprises operating on the first set of inliers using a least squares method in a first joint trial to produce a second set of inliers, computing changes in rotation and translation for the second set of inliers from the first joint trial, and scoring the changes in rotation and translation for the second set of inliers from the first joint trial. The first and second sets of inliers are then compared to determine appropriate outputs during one or more iterations.

BRIEF DESCRIPTION OF THE DRAWINGS

Features of the present invention will become apparent to those skilled in the art from the following description with reference to the drawings. Understanding that the drawings depict only typical embodiments of the invention and are not therefore to be considered limiting in scope, the invention will be described with additional specificity and detail through the use of the accompanying drawings, in which.

DETAILED DESCRIPTION

In the following detailed description, embodiments are described in sufficient detail to enable those skilled in the art to practice the invention. It is to be understood that other embodiments may be utilized without departing from the scope of the present invention. The following detailed description is, therefore, not to be taken in a limiting sense.

The present invention is directed to a method and system for real-time visual odometry, which can be used in frame-to-frame navigation techniques. The method can be utilized in GPS-limited or denied navigation systems used for navigating unmanned or manned ground vehicles, or for personal navigation, such as those that use an inertial measurement unit (IMU). The present method can be used to compensate for drift in such inertial navigation systems when a GPS signal is unavailable. Alternatively, the present method can be used for navigation without using an IMU or a GPS signal. The present method and system also minimize errors in the estimation of delta position/delta attitude using electro optical (EO) aiding sources.

In general, the present method and system can robustly estimate vehicle motion, including relative position and attitude change, from three-dimensional images (3-D) in real-time. The 3-D images can be produced using any sensor device or combination of sensor devices that can compute a range to known features at a location by providing depth or intensity information in three dimensions. Non-limiting examples of suitable sensor devices include stereo cameras, light detection and ranging (lidar) devices, radar devices, sonar devices, and the like. These devices exemplify a means for producing a 3-D image.

Figure 1:
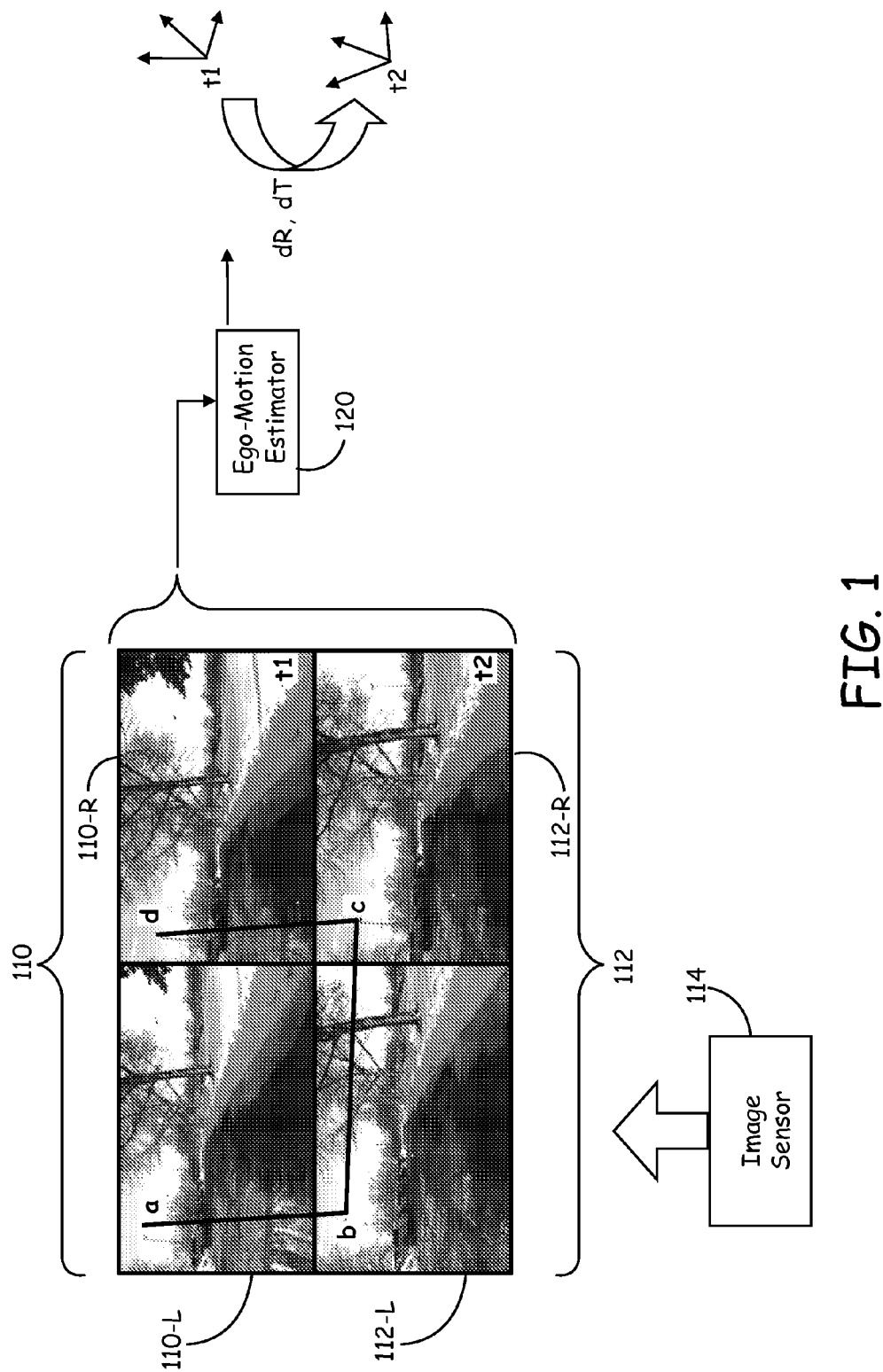
FIG. 1 is a schematic depiction of one implementation for estimating vehicle motion from three-dimensional images using the method of the invention.

FIG. 1 depicts one implementation for estimating vehicle motion using the present method. A first image pair 110 and a second image pair 112 are produced by an image sensor device 114, such as a stereo camera. The first image pair 110 includes a left frame 110-L and a right frame 110-R captured at a first time (t1), and the second image pair 112 includes a left frame 112-L and a right frame 112-R captured at a second time (t2).

The first and second image pairs 110 and 112 are processed in an ego-motion estimator 120 to determine the change in rotation (dR) and the change in translation (dT) of the first and second image pairs from time t1 to time t2. The ego-motion estimator 120 can have one or more processors for running software to perform various tasks as described hereafter.

In general, the ego-motion estimator 120 extracts features and their descriptors from the left and right frames of each image pair. The features are matched across the left and right frames of the image pairs. The matches are filtered using the epipolar constraint to reject false matches. For example, a unique feature that can be identified and matched in each image frame of FIG. 1 is the top of a lamp post, labeled as a, b, c, and d, respectively, in left frame 110-L, left frame 112-L, right frame 112-R, and right frame 110-R. If stereo cameras are used, 3-D point clouds are constructed by using left and right images, which provide the location information in three dimensions of any feature matched from left to right in the image frames. If lidar is used, the matching is done only between time t1 and time t2 as the image already contains 3-D information. The ego-motion estimator 120 then uses the RANSAC (RANdom SAmple Consensus) program, and a unique iterative refinement algorithm to find dR and dT. The refinement algorithm is discussed in further detail hereafter.

Ego-Motion and RANSAC

The computation of camera motion from an image sequence, called ego-motion, is a technique for improving the position estimation capability of a mobile unmanned platform such as a UAV, robot, and the like, since odometry errors can grow rapidly. In using ego-motion estimation, the following applies: given 3-D coordinates of N points in two instants of time, find rotation transformation (dR) and translation (dT) such that:

$$J=\Sigma(P_i-dRQ_i-dT)^T(P_i-dRQ_i-dT)$$

is minimized, where J is a cost function. The parameters P and Q represent 3-D points at two different times. An analytical solution in terms of quaternion and orthonormal matrices exists for obtaining absolute orientation. However, a problem is that least-square algorithms are sensitive to outliers. Accordingly, the RANSAC program is used to reject bad feature matches.

The RANSAC program uses an iterative technique to estimate parameters of a mathematical model from a set of observed data. A basic assumption of the RANSAC program is that the data contains "inliers" which are data points that can be explained by some set of model parameters, and "outliers" which are data points that do not fit the model. The outliers can arise from noise or erroneous measurements. The RANSAC program also assumes that, given a set of inliers, there exists a procedure which can estimate the parameters of a model that optimally explains or fits the data.

Further details regarding the RANSAC program are in an article by M. A. Fischler, R. C. Bolles, "Random Sample Consensus: A Paradigm for Model Fitting with Applications to Image Analysis and Automated Cartography," *Comm. of the ACM* 24: 381-395 (June 1981), which is incorporated herein by reference.

Refinement Algorithm

While the RANSAC program eliminates some outlier points, it typically keeps some outlier points as inlier points. The refinement algorithm computes the least squares fit on the best candidates of data points output from RANSAC to get a more accurate dR and dT by keeping inliers and eliminating outliers.

Figure 2:
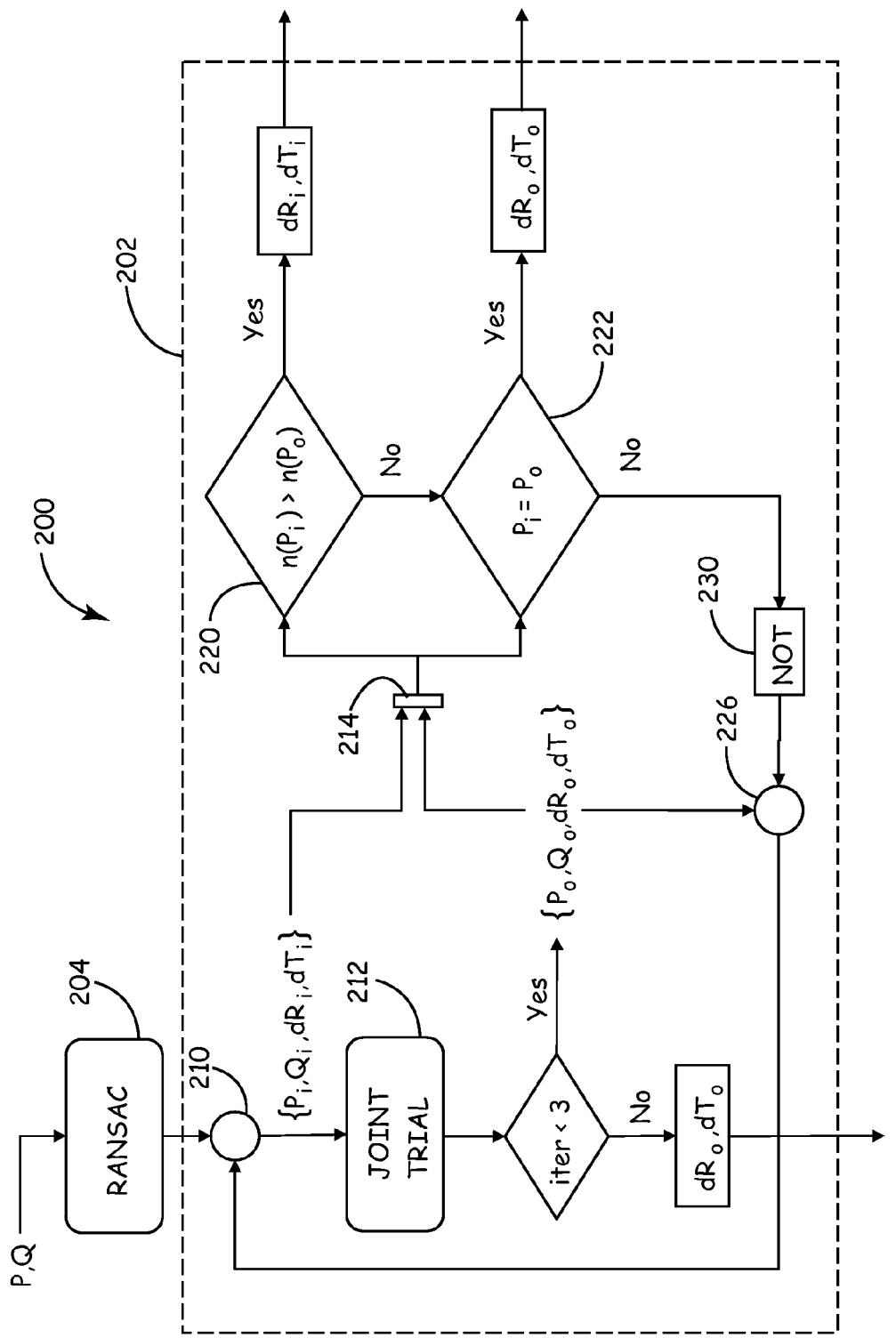
FIG. 2 is a flow diagram for a refinement algorithm used in the method of the invention.

FIG. 2 is a flow diagram for a method 200 according to the present invention, in which a data refinement module 202 is used in conjunction with a RANSAC module 204. The data refinement module 202 implements a refinement algorithm for the RANSAC program that checks whether the least squares method used in the RANSAC program produced consistent results.

In the method 200, a first set of 3-D data points P at a first time (t1) and a second set of 3-D data points Q at a second time (t2) are input into RANSAC module 204. For example, the first set of 3-D data points P can include 20 data points (P1-P20) and the second set of data points Q will include 20 data points (Q1-Q20). The sets of 3-D data points can be provided by image feature extraction and matching techniques as described previously. The RANSAC module 204 performs the least squares method on random sets of three data points (triplet trials) to eliminate any outlier data points and obtain the best triplet.

The best triplet is output from RANSAC module 204 and defines an initial (first) set of inliers ($P_i$, $Q_i$) and changes in rotation ($dR_i$) and translation ($dT_i$), which are input into data refinement module 202 at collection node 210. The software of data refinement module 202 is configured to run in an iterative manner until all conditions are met. The $dR_i$ and $dT_i$ are scored by counting the number of 3-D point pairs during a first iteration.

The first set of inliers ($P_i$, $Q_i$) is sent to a joint trial module 212 that operates on the first set of inliers using the least squares method to produce a second set of inliers ($P_o$, $Q_o$) in a first joint trial. The changes in rotation ($dR_o$) and translation ($dT_o$) are computed for the first set of inliers ($P_i$, $Q_i$) from the first joint trial during the first iteration. The $dR_o$ and $dT_o$ of the joint trial are scored by counting the number of 3-D point pairs. During the first iteration, the score of the $dR_o$ and $dT_o$ of the first joint trial is compared with the score of the $dR_i$ and $dT_i$ of the first set of inliers at a comparator 214 to determine appropriate outputs. When the score of the $dR_i$ and $dT_i$ is greater than the score of the $dR_o$ and $dT_o$ for the second set of inliers, the $dR_i$ and $dT_i$ are output. For example, if the second set has too few inliers ($n(P_i)>n(P_o)$), "Yes" at decision box 220), the results of the first joint trial are rejected and the $dR_i$ and $dT_i$ of the first set of inliers are kept and output from data refinement module 202 for further use, such as in a navigation method. When the score of the $dR_i$ and $dT_i$ is equal to the score of the $dR_o$ and $dT_o$, the $dR_o$ and $dT_o$ is output. For example, if the first and second sets of inliers are the same ($P_i=P_o$, "Yes" at decision box 222), the results of the joint trial $dR_o$ and $dT_o$ are accepted and output from data refinement module 202 for further use, such as in a navigation method.

If the first and second sets of inliers are different ("No" at decision box 222), then the second set of inliers ($P_o$, $Q_o$) is sent from a holding node 226 to collection node 210 upon a signal from a NOT command 230. The above steps are repeated using the second set of inliers, which are input into joint trial module 212 for a second joint trial (second iteration) using the least squares method to produce a third set of inliers ($P_o$, $Q_o$). The changes in rotation ($dR_o$) and translation ($dT_o$) are computed for the third set of inliers from the second joint trial. The $dR_o$ and $dT_o$ of the second joint trial are then scored.

During the second iteration, the score of the $dR_o$ and $dT_o$ of the second joint trial is compared with the score of the $dR_o$ and $dT_o$ of the first joint trial at comparator 214. If there are too few inliers, the results of the second joint trial are rejected and the $dR_o$ and $dT_o$ of the first joint trial are kept and output from data refinement module 202. If the second and third sets of inliers are the same, the results of the second joint trial $dR_o$ and $dT_o$ are accepted and output from data refinement module 202.

If the second and third sets of inliers are different, then the third set of inliers ($P_o$, $Q_o$) is sent from holding node 226 to collection node 210 and input into joint trial module 212, where a final joint trial (third iteration) is performed for the third set of inliers ($P_o$, $Q_o$) using the least squares method to produce a fourth set of inliers ($P_o$, $Q_o$). The changes in rotation ($dR_o$) and translation ($dT_o$) are computed for the fourth set of inliers from the final joint trial. Since the algorithm of refinement module 202 has gone through three iterations (inter<3, "No" at decision box 230), the results of the final joint trial ($dR_o$ and $dT_o$) for the fourth set of inliers are accepted and output from data refinement module 202 for further use.

System Data Flow

Figure 3:
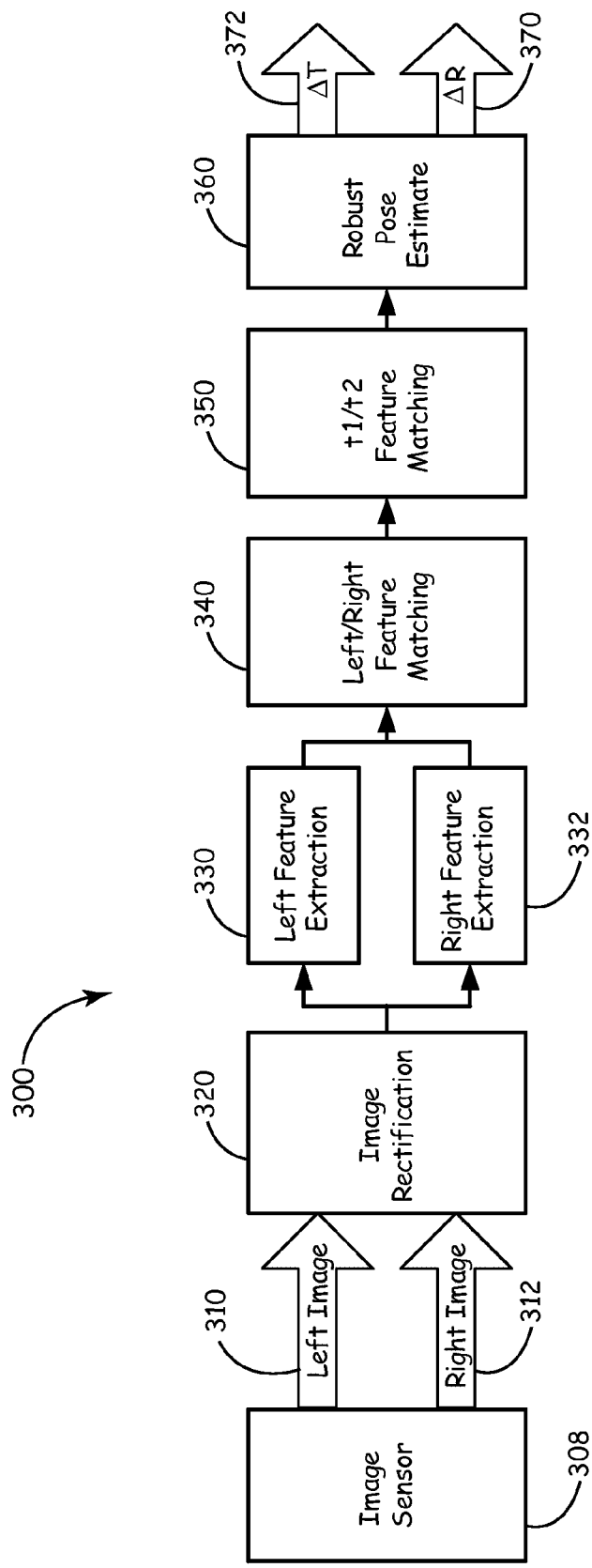
FIG. 3 is a block diagram showing the data flow for one embodiment of a system of the invention.

FIG. 3 is a block diagram showing the data flow for one implementation of a system 300 for real-time visual odometry according to the invention. An image sensor device 308, such as a stereo camera, is configured to capture consecutive two-dimensional images each comprising a left image 310 and a right image 312. The left image 310 and right image 312 are received by an image rectification module 320, which is configured to perform a transformation process to project left image 310 and right image 312 onto a common image surface to produce one 3-D image that is a composite of left image 310 and right image 312. The image rectification can correct for small changes in the orientation of two cameras, or can put images into a known orientation with respect to each other.

Image data from image rectification module 320 is input into a first processor 330 configured to extract one or more features and descriptors from left image 310 such as by using a Harris feature extractor. Image data from image rectification module 320 is also input into a second processor 332 that is run in parallel with the first processor. The second processor is configured to extract one or more features and descriptors from right image 312 such as by using a Harris feature extractor. The first and second processors can be part of a multiprocessor system, such as a duel core system, which speeds up the extraction process.

The results of the feature extraction are then input into a first feature matching program module 340, which is configured to match one or more features from left image 310 with one or more features from right image 312. The feature matching can be improved by use of the epipolar constraint, by requiring matched features to lie within a fixed number of rows in the images.

The features are then matched across time and a check loop using a second feature matching program module 350, which is configured to match one or more features from left image 310 and right image 312 at time t1, respectively, with one or more features from a subsequent left image and right image at time t2. The results are a set of 3-D points at time t1 matched to a set of 3-D points at time t2.

The 3-D data is then input into a robust pose estimator 360, which is configured to determine a change in rotation (dR) and a change in translation (dT) between the consecutive 3-D images. The dR and dT that are then output at 370 and 372 for further use, such as in a navigation system. The robust pose estimator 360 includes the RANSAC program and software code for implementing the present refinement algorithm, which provides a more accurate dR and dT. The execution time of the software code is driven by the number of image input features and the number of RANSAC trials that are run.

Instructions for carrying out the various process tasks, calculations, and generation of signals and other data used in the operation of the method of the invention can be implemented in a computer program product including software, firmware, or other computer readable instructions. These instructions are typically stored on any appropriate computer readable medium used for storage of computer readable instructions or data structures. Such computer readable media can be any available media that can be accessed by a general purpose or special purpose computer or processor, or any programmable logic device. For example, the present method and system can be implemented in software that is run on a laptop computer.

Suitable computer readable media may comprise, for example, non-volatile memory devices including semiconductor memory devices such as EPROM, EEPROM, or flash memory devices; magnetic disks such as internal hard disks or removable disks; magneto-optical disks; CDs, DVDs, or other optical storage disks; nonvolatile ROM, RAM, and other like media; or any other media that can be used to carry or store desired program code means in the form of computer executable instructions or data structures. Any of the foregoing may be supplemented by, or incorporated in, specially-designed application-specific integrated circuits (ASICs), or field programmable gate arrays (FPGAs). When information is transferred or provided over a network or another communications connection (either hardwired, wireless, or a combination of hardwired or wireless) to a computer, the computer properly views the connection as a computer readable medium. Thus, any such connection is properly termed a computer readable medium. Combinations of the above are also included within the scope of computer readable media.

The method of the invention can be implemented in computer readable instructions, such as program modules or applications, which are executed by a data processor. Generally, program modules or applications include routines, programs, objects, data components, data structures, algorithms, and the like, which perform particular tasks or implement particular abstract data types. These represent examples of program code for executing steps of the methods disclosed herein. The particular sequence of such executable instructions or associated data structures represent examples of corresponding acts for implementing the functions described in such steps.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A method for real-time visual odometry, the method comprising:
   capturing a first three-dimensional image of a location at a first time;
   capturing a second three-dimensional image of the location at a second time that is later than the first time;

extracting one or more features and their descriptors from each of the first and second three-dimensional images;

matching one or more features from the first three-dimensional image with one or more features from the second three-dimensional image; and determining a change in rotation and a change in translation between the first and second three-dimensional images from the first time to the second time using a random sample consensus (RANSAC) process and an iterative refinement technique, wherein the iterative refinement technique comprises:

receiving a first set of inliers and changes in rotation and translation for the first set of inliers outputted from the RANSAC process;

scoring the changes in rotation and translation for the first set of inliers;

operating on the first set of inliers using a least squares method in a first joint trial to produce a second set of inliers during a first iteration;

computing changes in rotation and translation for the second set of inliers from the first joint trial;

scoring the changes in rotation and translation for the second set of inliers from the first joint trial; and comparing the score of the changes in rotation and translation for the first set of inliers with the score of the changes in rotation and translation for the second set of inliers to determine appropriate outputs during the first iteration.

2. The method of claim 1, wherein comparing the score of the changes in rotation and translation for the first set of inliers with the score of the changes in rotation and translation for the second set of inliers further comprises:

outputting the changes in rotation and translation for the first set of inliers when the score of the changes in rotation and translation for the first set of inliers is greater than the score of the changes in rotation and translation for the second set of inliers; and outputting the changes in rotation and translation for the second set of inliers when the score of the changes in rotation and translation for the first set of inliers is equal to the score of the changes in rotation and translation for the second set of inliers.

3. The method of claim 2, wherein if the score of the changes in rotation and translation for the first set of inliers is not greater than or equal to the score of the changes in rotation and translation for the second set of inliers, the method further comprises:

operating on the second set of inliers using a least squares method in a second joint trial to produce a third set of inliers during a second iteration;

computing changes in rotation and translation for the third set of inliers from the second joint trial;

scoring the changes in rotation and translation for the third set of inliers from the second joint trial; and comparing the score of the changes in rotation and translation for the second set of inliers with the score of the changes in rotation and translation for the third set of inliers to determine appropriate outputs during the second iteration.

4. The method of claim 3, wherein comparing the score of the changes in rotation and translation for the second set of inliers with the score of the changes in rotation and translation for the third set of inliers further comprises:

outputting the changes in rotation and translation for the second set of inliers when the score of the changes in rotation and translation for the second set of inliers is greater than the score of the changes in rotation and translation for the third set of inliers; and outputting the changes in rotation and translation for the third set of inliers when the score of the changes in rotation and translation for the second set of inliers is equal to the score of the changes in rotation and translation for the third set of inliers.

5. The method of claim 4, wherein if the score of the changes in rotation and translation for the second set of inliers is not greater than or equal to the score of the changes in rotation and translation for the third set of inliers, the method further comprises:

operating on the third set of inliers using a least squares method in a third joint trial to produce a fourth set of inliers during a third iteration;

computing changes in rotation and translation for the fourth set of inliers from the third joint trial; and outputting the changes in rotation and translation for the fourth set of inliers.

6. The method of claim 1, wherein the first and second three-dimensional images are captured with a stereo camera.

7. The method of claim 1, wherein the first and second three-dimensional images each comprise a composite of a left image frame and a right image frame.

8. The method of claim 7, wherein the left image frame and the right image frame are projected onto a common image surface using an image rectifier.

9. The method of claim 7, further comprising extracting one or more features and their descriptors from the left image frame using a first processor.

10. The method of claim 9, further comprising extracting one or more features and their descriptors from the right image frame using a second processor in parallel with the first processor.

11. The method of claim 10, further comprising matching one or more features from the left image frame with one or more features from the right image frame.

12. The method of claim 11, further comprising matching one or more features from the left image frame and the right image frame, respectively, with one or more features from a subsequent left image frame and right image frame.

13. The method of claim 12, further comprising constructing a three-dimensional data point cloud.

14. The method of claim 1, wherein the first and second three-dimensional images are captured with an image sensor device comprising a light detection and ranging device, a radar device, or a sonar device.

15. The method of claim 1, wherein the features are matched by employing an epipolar constraint.

16. A system for real-time visual odometry, comprising:

an image sensor device configured to capture consecutive three-dimensional images each comprising a left image frame and a right image frame;

an image rectifier configured to project the left image frame and the right image frame onto a common image surface;

a first processor configured to extract one or more features and their descriptors from the left image frame;

a second processor in parallel with the first processor and configured to extract one or more features and their descriptors from the right image frame;

a first feature matching unit configured to match one or more features from the left image frame with one or more features from the right image frame;

a second feature matching unit configured to match one or more features from the left image frame and the right image frame, respectively, with one or more features from a subsequent left image frame and right image frame; and a robust pose estimator configured to determine a change in rotation and a change in translation between the consecutive three-dimensional images, wherein the robust pose estimator comprises program code for a random sample consensus (RANSAC) process and a refinement technique, wherein the refinement technique comprises:

program code to receive a first set of inliers and changes in rotation and translation for the first set of inliers outputted from the RANSAC process;

program code to score the changes in rotation and translation for the first set of inliers;

program code to operate on the first set of inliers using a least squares method in a first joint trial to produce a second set of inliers;

program code to compute changes in rotation and translation for the second set of inliers from the first joint trial; and program code to score the changes in rotation and translation for the second set of inliers from the first joint trial.

17. The system of claim 16, wherein the image sensor device comprises a stereo camera.

18. The system of claim 16, wherein the refinement technique further comprises:

program code to compare the score of the changes in rotation and translation for the first set of inliers with the score of the changes in rotation and translation for the second set of inliers to determine appropriate outputs during one or more iterations.

19. A computer program product, comprising:

a non-transitory computer readable medium having instructions stored thereon for implementing a method for real-time visual odometry using a random sample consensus (RANSAC) process and an iterative refinement technique, wherein the iterative refinement technique comprises:

receiving a first set of inliers and changes in rotation and translation for the first set of inliers outputted from the RANSAC process;

scoring the changes in rotation and translation for the first set of inliers;

operating on the first set of inliers using a least squares method in a first joint trial to produce a second set of inliers;

computing changes in rotation and translation for the second set of inliers from the first joint trial;

scoring the changes in rotation and translation for the second set of inliers from the first joint trial; and comparing the score of the changes in rotation and translation for the first set of inliers with the score of the changes in rotation and translation for the second set of inliers to determine appropriate outputs during one or more iterations.

20. The computer program product of claim 19, wherein comparing the score of the changes in rotation and translation for the first set of inliers with the score of the changes in rotation and translation for the second set of inliers further comprises:

outputting the changes in rotation and translation for the first set of inliers when the score of the changes in rotation and translation for the first set of inliers is greater than the score of the changes in rotation and translation for the second set of inliers; and outputting the changes in rotation and translation for the second set of inliers when the score of the changes in rotation and translation for the first set of inliers is equal to the score of the changes in rotation and translation for the second set of inliers.

* * * * *